United States Patent
Lo

(10) Patent No.: US 8,014,313 B1
(45) Date of Patent: *Sep. 6, 2011

(54) NETWORK INTERFACE WITH AUTONEGOTIATION AND CABLE LENGTH MEASUREMENT

(75) Inventor: William Lo, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 0 days.

This patent is subject to a terminal disclaimer.

(21) Appl. No.: 12/748,884

(22) Filed: Mar. 29, 2010

Related U.S. Application Data

(63) Continuation of application No. 11/595,053, filed on Nov. 10, 2006, now Pat. No. 7,688,749.

(60) Provisional application No. 60/788,823, filed on Apr. 3, 2006.

(51) Int. Cl.
*H04L 12/26* (2006.01)
(52) U.S. Cl. .......................... 370/252; 370/445
(58) Field of Classification Search .......................... None
See application file for complete search history.

(56) References Cited

U.S. PATENT DOCUMENTS

| | | | |
|---|---|---|---|
| 4,914,394 A | 4/1990 | Meyer | |
| 5,420,512 A | 5/1995 | Spillane et al. | |
| 5,461,318 A | 10/1995 | Borchert et al. | |
| 5,610,903 A * | 3/1997 | Crayford | 370/213 |
| 6,138,080 A | 10/2000 | Richardson | |
| 6,198,727 B1 | 3/2001 | Wakeley et al. | |
| 6,377,640 B2 | 4/2002 | Trans | |
| 6,434,716 B1 | 8/2002 | Johnson et al. | |
| 6,438,163 B1 | 8/2002 | Raghavan et al. | |
| 6,448,899 B1 | 9/2002 | Thompson | |
| 6,522,152 B1 | 2/2003 | Tonti et al. | |
| 6,535,983 B1 | 3/2003 | McCormack et al. | |
| 6,600,755 B1 | 7/2003 | Overs et al. | |
| 6,694,017 B1 | 2/2004 | Takada | |
| 6,728,216 B1 | 4/2004 | Sterner | |
| 6,775,529 B1 | 8/2004 | Roo | |
| 6,825,672 B1 | 11/2004 | Lo | |
| 6,829,223 B1 | 12/2004 | Richardson et al. | |
| 7,005,861 B1 | 2/2006 | Lo et al. | |
| 7,127,481 B1 | 10/2006 | Lam | |
| 7,161,911 B1 | 1/2007 | Fang et al. | |
| 7,203,851 B1 | 4/2007 | Lo et al. | |
| 7,317,732 B2 | 1/2008 | Mills et al. | |
| 7,403,018 B1 | 7/2008 | Lo et al. | |
| 7,624,197 B1 | 11/2009 | Lo | |
| 2002/0041571 A1 * | 4/2002 | Huff | 370/252 |
| 2002/0124110 A1 | 9/2002 | Tanaka | |
| 2005/0129052 A1 * | 6/2005 | Hurwitz et al. | 370/445 |

(Continued)

FOREIGN PATENT DOCUMENTS

WO  WO 01/11861  2/2001

(Continued)

OTHER PUBLICATIONS

U.S. Appl. No. 60/217,418, filed Jul. 11, 2000, Lam.

(Continued)

*Primary Examiner* — Min Jung

(57) ABSTRACT

A physical layer device includes a transceiver module that communicates with a medium. An autonegotiation module autonegotiates one of N link capabilities with a link partner that advertises one of the link capabilities, where N is an integer greater than or equal to two. The autonegotiation module selects the advertised link capability of the link partner.

19 Claims, 9 Drawing Sheets

U.S. PATENT DOCUMENTS

2006/0280132 A1 12/2006 Connor
2009/0245274 A1* 10/2009 Hurwitz et al. ............... 370/445

FOREIGN PATENT DOCUMENTS

WO     WO 01/11861 A2     2/2001
WO     WO 01/11861 A3     2/2001

OTHER PUBLICATIONS

IEEE Computer Society; IEEE Standard 802.3ab; IEEE Std 802.3-2002, IEEE Standard for Information technology—Telecommunications and information exchange between systems—Local and metropolitan area networks—Specific requirements; Part 3: Carrier sense multiple access with collision detection (CSMA/CD) access method and physical layer specifications, Mar. 8, 2002, pp. 147-249.
IEEE Std 802.3-2002 (Revision of IEEE Std 802.3, 2000 Edition); 802.3 IEEE Standard for Information Technology—Telecommunications and information exchange between systems—Local and metropolitan area networks—Specific requirements; Part 3: Carrier sense multiple access with collision detection (CSMA/CD) access method and physical layer specifications , IEEE Computer Society, Sponsored by the LAN/MAN Standards Committee (pp. 1-552).
(Section Two) Information technology—Telecommunications and information exchange between systems—Local and metropolitan area networks—Specific requirements—Part 3: Carrier Sense Multiple Access with Collision Detection (CSMA/CD) access method and physical layer specifications (pp. 1-581).
(Section Three) Information technology—Telecommunications and information exchange between systems—Local and metropolitan area networks—Specific requirements—Part 3: Carrier Sense Multiple Access with Collision Detection (CSMA/CD) access method and physical layer specifications (pp. 1-379).
Intel, "LXT9784 Octal 10/100 Transceiver Hardware Integrity Function Overview" Application Note, Jan. 2001, pp. 3-14.

* cited by examiner

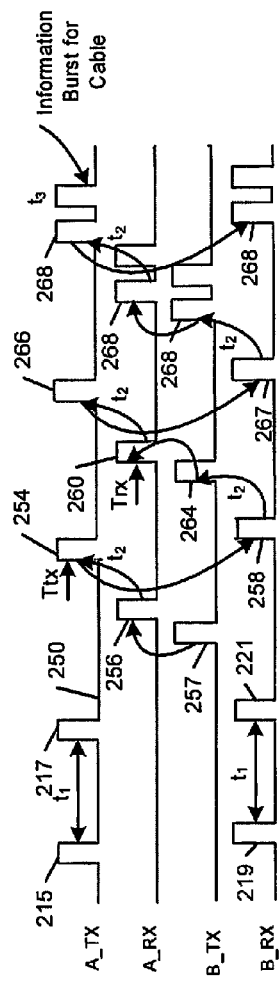

| Bit | Standard Base Page | Modified Base Page |
|---|---|---|
| 16 | Next Page | Next Page |
| 15 | Acknowledge | Acknowledge |
| 14 | Remote Fault | Remote Fault |
| 13 | Reserved | 400BASE-T Full Duplex |
| 12 | Asymmetric Pause | Asymmetric Pause |
| 11 | Pause | Pause |
| 10 | 100BASE-T4 | 200BASE-T Full Duplex |
| 9 | 100BASE-X Half Duplex | 100BASE-X Half Duplex |
| 8 | 100BASE-X Full Duplex | 10BASE-X Full Duplex |
| 7 | 10BASE-X Full Duplex | 10BASE-X Half Duplex |
| 6 | 10BASE-X Half Duplex | 10BASE-X Half Duplex |
| 5 | Selector Bit 4 = 0 | Selector Bit 4 = 0 |
| 4 | Selector Bit 3 = 0 | Selector Bit 3 = 0 |
| 3 | Selector Bit 2 = 0 | Selector Bit 2 = 1 |
| 2 | Selector Bit 1 = 0 | Selector Bit 1 = 0 |
| 1 | Selector Bit 0 = 1 | Selector Bit 0 = 0 |

| Cable Length | Pulses |
|---|---|
| <20m | 2 |
| 20~40m | 3 |
| 40~60m | 4 |
| 60~80m | 5 |
| 80~100m | 6 |
| 100m-120m | 7 |
| 120m-140m | 8 |
| 160m-180m | 10 |
| 180m-200m | 11 |

FIG. 7

| Autonegotiation | Operational Mode |
|---|---|
| 400BASE-T | If MIN(Measured Cable Length, Link Partner Measured Cable Length) < MAX_400BASE-T_Length Operate in 400BASE-T with cable setting of MIN(Measured Cable Length, Link Partner Measured Cable Length) else Operate in 200BASE-T with cable setting of MIN(Measured Cable Length, Link Partner Measured Cable Length) |
| 200BASE-T | Operate in 200BASE-T with cable setting of MIN(Measured Cable Length, Link Partner Measured Cable Length) |
| 100BASE-T Full Duplex | Operate in 100BASE-T Full Duplex |
| 100BASE-T Half Duplex | Operate in 100BASE-T Half Duplex |
| 10BASE-T Full Duplex | Operate in 10BASE-T Full Duplex |

NETWORK INTERFACE WITH AUTONEGOTIATION AND CABLE LENGTH MEASUREMENT

CROSS-REFERENCE TO RELATED APPLICATIONS

This application is a continuation of U.S. patent application Ser. No. 11/595,053, filed Nov. 10, 2006, which claims the benefit of U.S. Provisional Application No. 60/788,823, filed Apr. 3, 2006. The disclosures of the above applications are incorporated herein by reference in their entirety.

FIELD

The present disclosure relates to network interfaces, and more particularly to autonegotiation and cable length measurement in a network interface.

BACKGROUND

The Background description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

Referring now to FIG. 1, first and second network devices 10 and 12 include network interfaces 14 and 16, respectively, each with physical layer devices (PHYs) 18 and 20, respectively. The PHYs 18, 20 communicate with a medium 19 such as cable including twisted pairs of wire. The PHYs 18, 20 communicate with media access control devices (MACs), 19, 21, respectively, which provide an interface between the PHYs 18, 20 and the network devices 10, 12, respectively. The PHYs 18, 20 also include respective transmitters and receivers that are collectively identified at 22, 24. The PHYs 18, 20 include autonegotiation modules 26, 28, respectively. As can be appreciated, the autonegotiation modules 26, 28 may be disabled; and/or the PHYs 18, 20 may be operated in forced 10 Mb/s or 100 Mb/s modes. The autonegotiation modules 26, 28 may be disabled during debug and/or troubleshooting to reduce system complexity.

There are different Ethernet networking standards having different data rates. 1000BASE-T has a maximum data rate of 1 Gb/s. 100BASE-TX has a maximum data rate of 100 Mb/s. 10BASE-T has a maximum data rate of 10 Mb/s. When two network devices communicate, they preferably communicate at the highest common speed. The procedure for negotiating the communication speed and/or other connection details is called autonegotiation. Further details concerning autonegotiation are also set forth in IEEE section 802.3, which is hereby incorporated by reference in its entirety.

Referring now to FIG. 2, a simplified state diagram corresponding to FIGS. 28-16 of IEEE section 802.3 is shown. Generally, a local network device and a remote link partner advertise their abilities before establishing a link. The two network devices then select modes of operation that are shared. During autonegotiation, a network device may transition through states 76→78→80→82→84→86→82→84→88→94 in FIG. 2. State 90 is associated with an autonegotiation wait timer that typically has a period between 500 ms and 1000 ms. If the link drops out, the autonegotiation state machine transitions from state 90 to state 92 and returns to the initial state in state 80.

SUMMARY

A physical layer device comprises a transceiver module that communicates with a medium. An autonegotiation module of the physical layer device stalls a standard autonegotiation operation of a link partner until the autonegotiation module detects a selector field of the link partner. The autonegotiation module autonegotiates one of N link capabilities with the link partner based on the selector field, where N is an integer greater than or equal to two.

In other features, one of the N link capabilities comprises 400BASE-T and 200BASE-T. One of the N link capabilities comprises at least one of 10BASE-T and 100BASE-T. The autonegotiation module compares the selector field from the link partner with a bit selector field of the physical layer device.

In other features, the medium includes a cable connected between the physical layer device and the link partner. A cable length estimator selectively determines a cable length between the physical layer device and the link partner when one of the N link capabilities of the physical layer device and the N link capabilities of the link partner are equal to each other and greater than a first of the N link capabilities. The autonegotiation module selects one of the N link capabilities of the link partner based on the cable length and a predetermined length.

In other features, the link partner comprises a link partner physical layer device. The physical layer device communicates with the link partner physical layer device. The cable length estimator determines the cable length based on latency between a transmitted pulse to the link partner and a received pulse from the link partner. The link partner sends a response pulse within a predetermined time after receiving the transmitted pulse. The physical layer device receives the response pulse and determines the latency based on the response pulse.

In other features, the cable length estimator verifies the cable length based on M latency determinations, where M is an integer greater than one. The physical layer device and the link partner physical layer device exchange cable length data using burst pulses representing the cable length.

In still other features, a physical layer device comprises a transceiver module that communicates through a cable. An autonegotiation module autonegotiates one of N link speeds with a link partner, where N is an integer greater than or equal to two. A cable length estimator selectively determines a length of the cable between the physical layer device and the link partner. The cable length estimator functions when one of the N link speeds of the physical layer device and an advertised link speed of the link partner are equal to each other and greater than a first of the N link speeds. The autonegotiation module selects the advertised link speed of the link partner based on the length of the cable below a predetermined length. The autonegotiation module selects one of the link speeds that is not advertised by the link partner based on the length of the cable above the predetermined threshold.

In other features, the one of the N link speeds comprises 400BASE-T and 200BASE-T. Further, the first of the N link speeds comprises at least one of 10BASE-T and 100BASE-T. In still other features, a method for operating a physical layer device comprises communicating with a medium. The method also includes stalling a standard autonegotiation operation of a link partner until a selector field of the link partner is detected. The method includes autonegotiating one of N link capabilities with the link partner based on the selector field, where N is an integer greater than or equal to two. The method also includes that one of the N link capabilities comprises 400BASE-T and 200BASE-T. One of the N link capabilities comprises at least one of 10BASE-T and 100BASE-T.

In other features, the method further comprises comparing the selector field from the link partner with a bit selector field of the physical layer device. The method also comprises communicating with a cable connected between the physical layer device and the link partner.

In other features, the method further comprises selectively determining a cable length between the physical layer device and the link partner. The method selectively determines the cable length. The method includes selecting the one of the N link capabilities of the link partner based on the cable length and a predetermined length.

In other features, the method comprises transmitting a pulse to the link partner, receiving a response pulse from the link partner, and determining the cable length based on latency between the pulse and the response pulse. The method further comprises sending the response pulse within a predetermined time after receiving the transmitted pulse and determining the latency based on the response pulse. The method further comprises verifying the cable length based on M latency determinations, where M is an integer greater than one. The method comprises exchanging cable length data using burst pulses representing the cable length.

In still other features, a method for operating a physical layer device comprises communicating through a cable and autonegotiating one of N link speeds with a link partner, where N is an integer greater than or equal to two. The method includes selectively determining a length of the cable between the physical layer device and the link partner when one of the N link speeds of the physical layer device and an advertised link speed of the link partner are equal to each other and greater than a first of the N link speeds. The method also includes selecting the advertised link speed of the link partner based on the length of the cable below a predetermined length. The method includes selecting one of the link speeds that is not advertised by the link partner based on the length of the cable above the predetermined threshold. One of the N link speeds comprises 400BASE-T and 200BASE-T. The first of the N link speeds comprises at least one of 10BASE-T and 100BASE-T.

In still other features, a physical layer device comprises means for transceiving that communicates with a medium. Means for autonegotiating stalls a standard autonegotiation operation of a link partner until a selector field of a means for linking is detected. The means for autonegotiating autonegotiates one of N link capabilities with means for linking based on the selector field, where N is an integer greater than or equal to two.

In other features, one of the N link capabilities comprises 400BASE-T and 200BASE-T, and one of the N link capabilities comprises at least one of 10BASE-T and 100BASE-T. The means for autonegotiating compares a bit selector field from the means for linking with a bit selector field of the physical layer device.

In other features, the medium includes means for connecting between the physical layer device and the means for linking. Means for estimating cable length selectively determines a cable length between the physical layer device and the link partner. The means for estimating cable length functions when one of N link capabilities of the physical layer device and an advertised link capability of the means for linking are equal to each other and greater than a first of the N link capabilities. The means for autonegotiating selects the one of the N link capabilities based on the cable length and a predetermined length.

In other features, the means for linking comprises a link partner physical layer device. The physical layer device communicates with the link partner physical layer device. The means for estimating cable length determines the cable length based on latency between a transmitted pulse to the means for linking and a received pulse from the means for linking. The means for linking sends a response pulse within a predetermined time after receiving the transmitted pulse. The physical layer device receives the response pulse and determines the latency based on the response pulse.

In other features, the means for estimating cable length verifies the cable length based on M latency determinations, where M is an integer greater than one. The physical layer device and the link partner physical layer device exchange cable length data using burst pulses representing the cable length.

In still other features, a computer program stored for use by a processor for operating a physical layer device communicates with a medium. The computer program stalls a standard autonegotiation operation of a link partner until the computer program detects a selector field of the link partner. The computer program autonegotiates one of N link capabilities with the link partner based on the selector field, where N is an integer greater than or equal to two.

In other features, one of the N link capabilities comprises 400BASE-T and 200BASE-T and one of the N link capabilities comprises at least one of 10BASE-T and 100BASE-T. The computer program compares a bit selector field from the link partner with a bit selector field of the physical layer device.

In other features, the medium includes a cable connected between the physical layer device and the link partner. The computer program selectively determines a cable length between the physical layer device and the link partner. The computer program selects the one of the N link capabilities of the link partner based on the cable length and a predetermined length.

In other features, the computer program determines the cable length based on latency between a transmitted pulse to the link partner and a received pulse from the link partner. The link partner sends a response pulse within a predetermined time after receiving the transmitted pulse. The physical layer device receives the response pulse and determines the latency based on the response pulse.

In other features, the computer program verifies the cable length based on M latency determinations, where M is an integer greater than one. The physical layer device and the link partner physical layer device exchange cable length data using burst pulses representing the cable length.

In still other features, a physical layer device comprises a transceiver module that communicates with a medium. An autonegotiation module of the physical layer device stalls a standard autonegotiation operation of a link partner until the autonegotiation module detects a selector field of the link partner. The autonegotiation module autonegotiates to one of a standard mode and a special capability mode with the link partner based on the selector field, where N is an integer greater than or equal to two.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5 is a base page bit definition table according to the disclosure;

FIG. 6 is a graphical illustration of a handshaking operation between a host device PHY and a link partner PHY;

FIG. 7 is a table illustrating a cable length to pulse mapping;

FIG. 8 is table of an autonegotiation priority resolution and resulting operational mode according to the disclosure;

DETAILED DESCRIPTION

Figure 1:
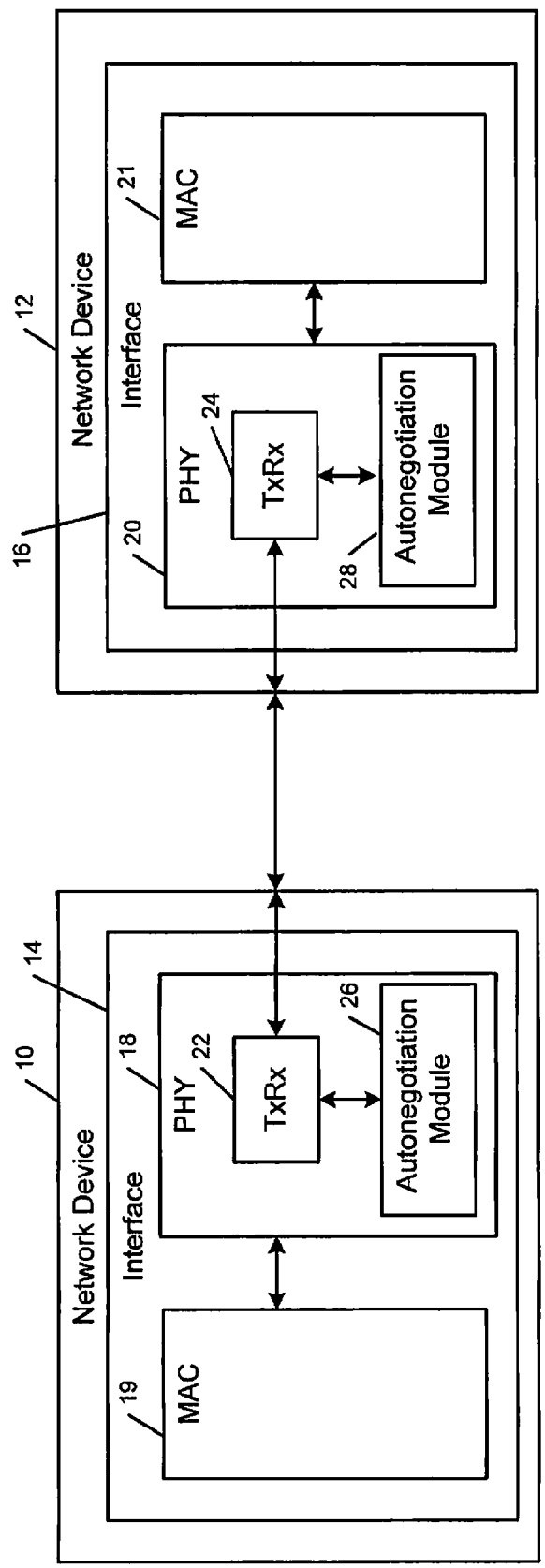
FIG. 1 is a more detailed functional block diagram of a network system according to the prior art.
Figure 2:
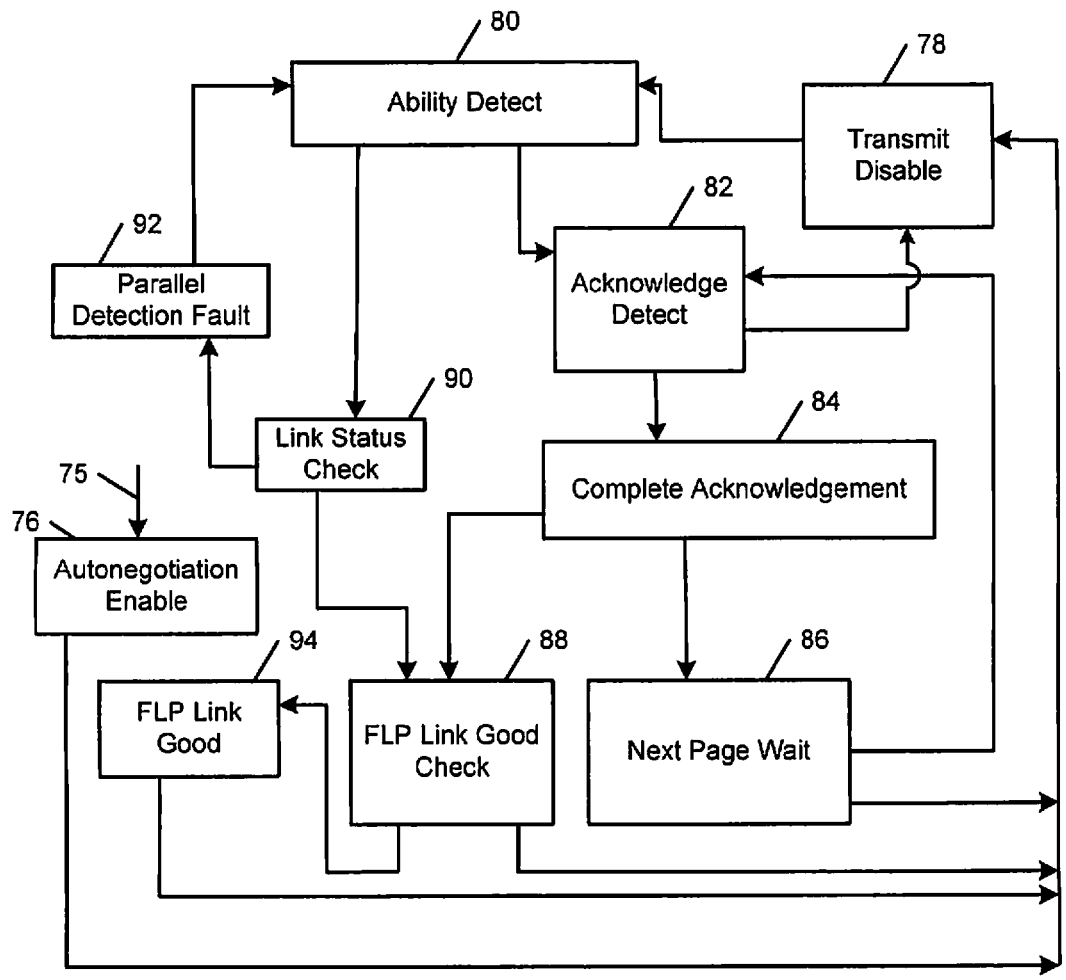
FIG. 2 is a simplified arbitration state diagram according to IEEE section 802.3.

The following description is merely exemplary in nature and is in no way intended to limit the disclosure, its application, or uses. For purposes of clarity, the same reference numbers will be used in the drawings to identify similar elements. As used herein, the term module, circuit and/or device refers to an Application Specific Integrated Circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical or. It should be understood that steps within a method may be executed in different order without altering the principles of the present disclosure.

Autonegotiation in accordance with IEEE section 802.3 is generally limited to 10BASE-T, 100BASE-TX, and/or 1000BASE-T. Recently developed modes, such as 200BASE-T and 400BASE-T, are not addressed during autonegotiation. The present disclosure describes systems and methods for autonegotiating PHYs that may include detecting that a link partner has special/advertised capabilities and then modifying an interpretation of the advertised capabilities.

The present disclosure also describes systems and methods for autonegotiating PHYs to 200BASE-T and 400BASE-T modes while remaining backwards compatible with IEEE Auto-Negotiations. Further, the present disclosure selectively determines the cable length between two PHYs so that if 400BASE-T is requested and the cable is too long, then the PHYs will instead operate at 200BASE-T or another speed.

Figure 3:
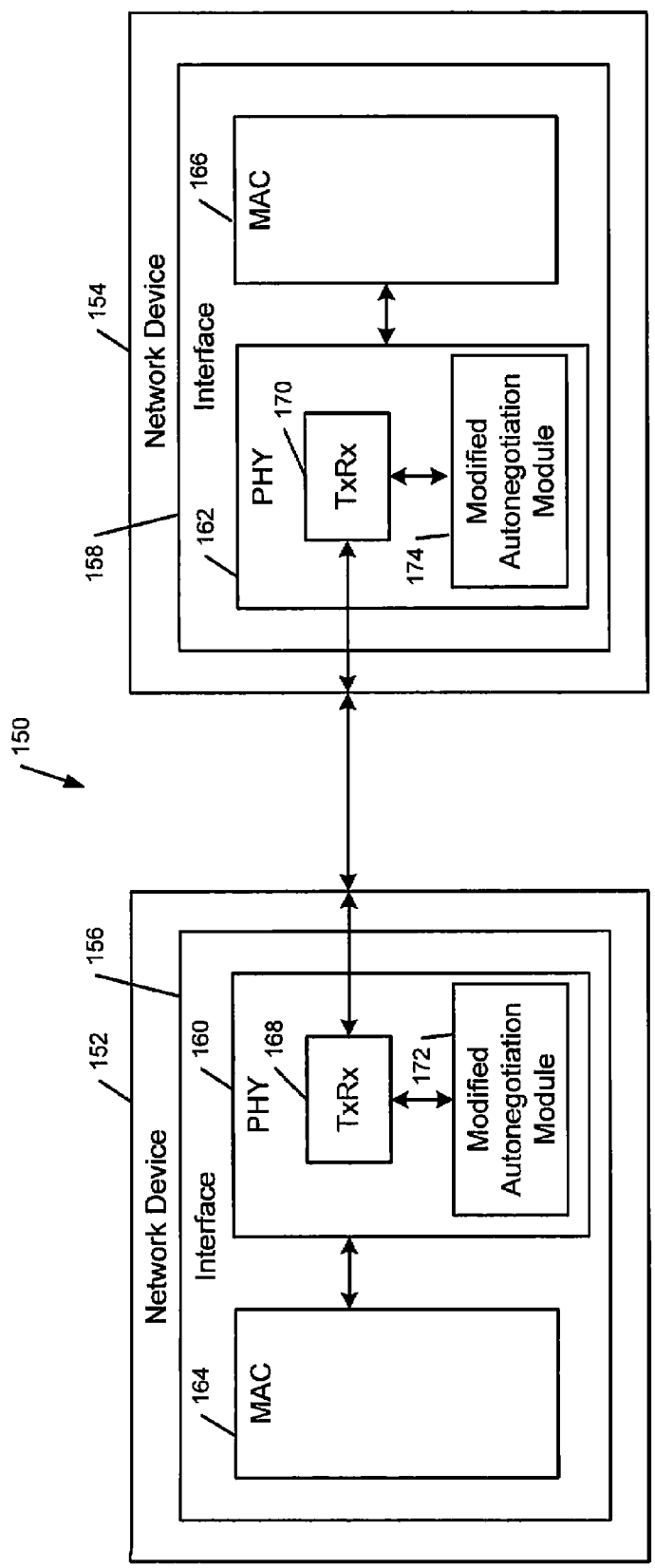
FIG. 3 is a detailed functional block diagram of a network system according to the disclosure.

Referring now to FIG. 3, a network system 150 includes first and second network devices 152, 154 having network interfaces 156 and 158, respectively, each with PHYs 160, 162, respectively. Each PHY 160, 162 communicates with a media access control device (MAC) 164, 166. The PHYs 160, 162 include transceivers 168, 170, respectively. The PHYs 160, 162 also include autonegotiation modules 172, 174 respectively. As can be appreciated, the autonegotiation modules 172, 174 may be selectively disabled during debug, troubleshooting and/or in other circumstances.

Figure 4:
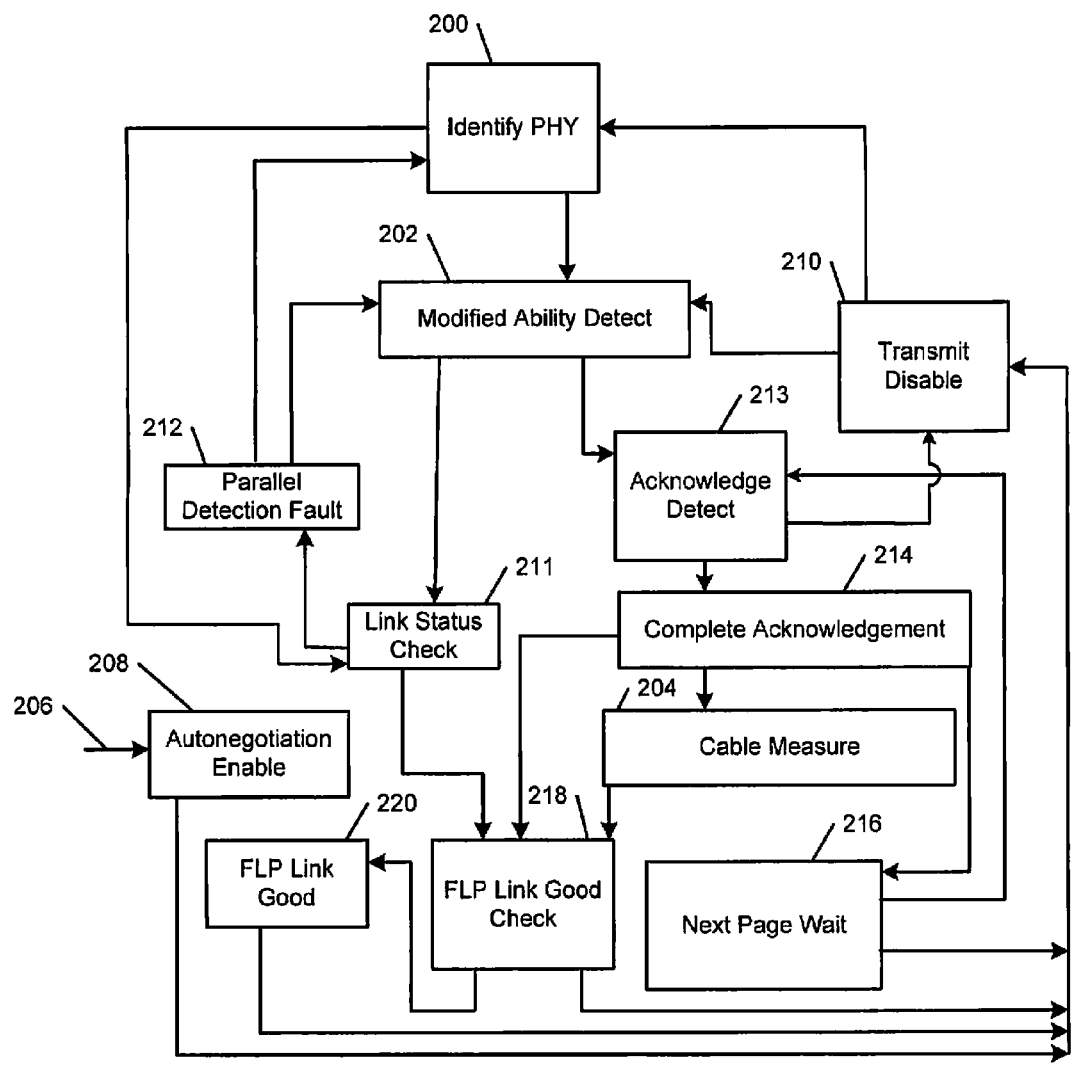
FIG. 4 is a modified arbitration state diagram according to the disclosure.

Referring now to FIGS. 4 and 4A, a state diagram for the autonegotiation arbitration state machine of IEEE 802.3 may be modified to include an identify PHY state 200, a modified ability detect state 202, and a cable measure state 204 (cable length estimator). The states 200 and 202 determine whether the link partner PHY has an enhanced transmission capability (for example 200BASE-T or 400BASE-T) and whether the transmission capability will function between the PHY 160 and the PHY 162 of a link partner. If the transmission capability is a speed capability, state 204 determines whether the speed capability will function over the length of cable One exemplary state transition for a network device response to an autonegotiation enable signal 206 is through states 208→210→200→202→213→214→204→218→220. In other words, when the network device has one of the enhanced transmission capabilities, the PHY 160 advertises 200BASE-T or 400BASE-T to the link partner. If the network device does not have one of the enhanced transmission capabilities, the Identify PHY state 200 is not entered, and a standard or default autonegotiation mode proceeds, e.g., through states 208→210→202→213→214→218→220. The states may be implemented by one or more modules within the PHY 160.

If both PHYs 160, 162 include the enhanced transmission capability, the identify PHY state 200 is entered before the modified ability detect state 202.

Referring now to FIGS. 4 and 5, while in the identify PHY state 200, the PHY 160 may transmit an alternate selector value (i.e. not the standard selector value) and may learn the selector value of the link partner. In other words, the PHY 160 may transmit a base page 222, which advertises 10BASE-T and 100BASE-T capabilities, as in standard autonegotiation. However, a standard 5 bit selector field value 224 of 00001 may be replaced with an alternate 5 bit selector field value 226 of 00100. At least one bit (of the base page that is not the selector field 226 or the acknowledge bit 228) may toggle on back to back fast link pulses (FLPs). This toggling process has the effect of preventing the link partner arbitration state machine from advancing since the toggling bit prevents the link partner from seeing three FLPs with all bits matching (other than the acknowledge bit). In other words, the link partner ability_match variable does not become true; and hence the link partner arbitration state machine does not advance from the ability detect state to the acknowledge detect state.

The PHY 160 can detect other possible capabilities though setting various bits in FIG. 5 that are not currently defined. For example, the selector field value 226 may be changed to a selector field value other than 00100.

Because the link partner may advertise a selector field, the PHY 160 learns the selector field of the link partner. If three FLPs are received with all 5 selector field bits matching, the page may be deemed reliable, and the PHY 160 decides on the speed (10BASE-T, 100BASE-T, 200BASE-T, 400BASE-T). In other words, both PHYs include the transmission capability; and the modified arbitration state machine of the PHY 160 moves from the identify PHY state 200 to the modified ability detect state 202. In the modified ability detect state 202, if the received selector field value matches the alternate selector, the PHY 160 advertises modified ability variables that are specific to the transmission capability, instead of the standard variables.

Referring now to FIG. 6, the cable length measurement state 204 can detect cable length. Control may enter the cable measure state 204 after complete acknowledgement state 214 and the link partner is acknowledged to be 200BASE-T and/or 400BASE-T capable. The cable length is determined by measuring latency between a transmitted pulse and a returned/received pulse. As an illustrative example, transmissions of the PHY 160 are labeled A_TX; signals received by the PHY 160 are labeled A_RX. Transmissions of the link partner 154 are labeled B_TX; signals received by the link partner 154 are labeled B_RX. The state 204 may transmit a series 250 of pulses 215, 217 every time period ($t_1$) received as pulses 219, 221. If no response is received from the link partner 154. Otherwise, the state 204 transmits a pulse 254 a time period $t_2$ after receiving a pulse 256 transmitted from the link partner 154 as pulse 257.

In FIG. 6, the cable length handshaking between the PHY 160 and the link partner PHY 162 occurs when both PHYs receive a pulse 258 and 260 and transmit a pulse 264 and 266 back (e.g. $t_2$ later). Cable measurement at the PHY 160 may be done by measuring the time from 254→258→264→260. Cable measurement at the link partner PHY 162 may be done by measuring the time from 264→260→266→267. Cable measurement may be deemed completed when the cable measure state 204 measures the same cable length a number of consecutive times, for example, seven.

Referring now to FIGS. 6 and 7, the spacing between pulses in a burst 268 may be a time period $t_3$; and the number of the pulses in the bust represents the cable length. One possible table 269 for indicating length of cable through pulses is illustrated. For example, two bursts may indicate a cable length less than 20 m, whereas eleven bursts may indicate a cable length between 180 m and 200 m. The PHY 160 may verify cable measurement by sending seven more bursts after receiving seven consecutive bursts from link partner with the same number of pulses. The autonegotiation module 172 therefore determines a length of the cable and designates a predetermined cable speed standard (e.g. 400BASE-T) based on the cable length. The threshold may be close to a maximum functional length for the cable speed standard.

Referring now to FIGS. 4, 8, the PHY operational speed and cable length between PHYs are used to adjust the transceivers. If there is an inconsistency between the cable length measurements between the two PHYs, the longer measured distance may prevail.

As an exemplary configuration, if the cable length setting is greater than a maximum length for 400BASE-T, the 400BASE-T resolution operates in 200BASE-T. For 400BASE-T, if the minimum ("MIN") of the measured cable length and the link partner measured cable length is less than maximum length for 400BASE-T, the PHY operates in 400BASE-T with a cable setting of MIN. Otherwise, the system operates in 200BASE-T with cable setting of MIN.

Figure 9:
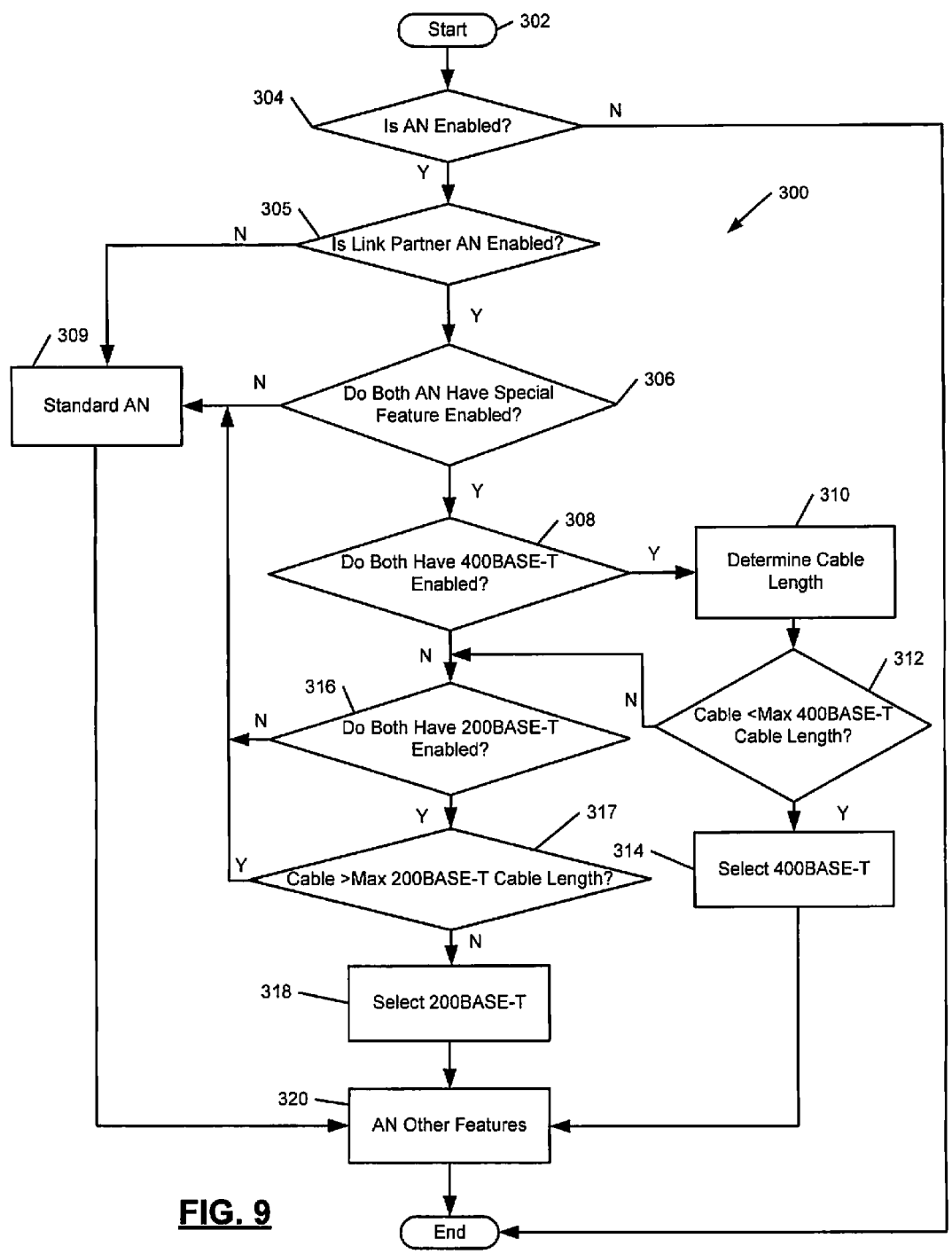
FIG. 9 is a flowchart illustrating steps of an autonegotiation method according to the disclosure.

Referring now to FIG. 9, steps for operating the autonegotiation module ("AN") according to the present disclosure are shown generally at 300. Control enters at step 302. In step 304, when the autonegotiation module is enabled, control continues to step 305, which advances control if the link partner autonegotiation module is enabled. In step 305, pause bits may be advertised by the host device PHY to pause or stall standard autonegotiation in the link partner. In this example, the value of 00100 will be sent instead of the standard 00001 (as seen in FIG. 5). The pause bits for every other FLP burst are inverted by the link partner. Since the link partner does not see three consecutive FLP bursts having the same bit pattern, autonegotiation in the link partner is stalled. The PHY may temporarily stall base page exchanges, i.e. the standard autonegotiation process, until the link partner selector field is learned.

In step 306, the PHY advertises capabilities to a link partner PHY. If both PHY devices have enhanced transmission capabilities (e.g. 200BASE-T and 400BASE-T capability), control continues to step 308. Also in step 306, the host device PHY and the link partner PHY advertise selector fields. Once the host device PHY learns the link partner selector field, the host device PHY determines whether the PHY can operate with the enhanced transmission capability. Otherwise, standard autonegotiation (e.g. 10BASE-T, 100BASE-T) may resume in step 309. In other words, if the link partner does not have a matching transmission capability, the host device PHY will default to sending the standard IEEE base page (register 4) in step 309, with the selector field being 00001. The pause bits will no longer toggle and autonegotiation ends.

For a link partner that does not include a PHY with the enhanced transmission capability, the selector field will be 00001, which is defined to be IEEE 802.3. For a host device PHY with the enhanced transmission capability, the selector field will be a value other then 00001. The alternate selector field value is defined to be 00100 in this example for PHYs capable of performing 200BASE-T and/or 400BASE-T. Other values of the selector field may be reserved for different PHY device capabilities. If the link partner has a matching enhanced transmission capability, the host PHY device may send a base page with a respective selector field, e.g. 00100.

In step 308, if both PHY devices are 400BASE-T enabled, cable length between the PHY devices is determined in step 310. In step 312 if cable length is less than a predetermined length, 400BASE-T is selected in step 314. Otherwise, in step 316, if both PHY devices are 200BASE-T enabled, a check is made whether cable length exceeds a predetermined length or a maximum length for 200BASE-T in state 317. If not, 200BASE-T is enabled in step 318. If 200BASE-T is not enabled in one of the PHY devices or if the cable length is greater than the maximum length for 200BASE-T, standard autonegotiation may resume in step 309. In response to completion of steps 314 and 318, other autonegotiation features are completed as necessary in step 320.

Figure 10A:
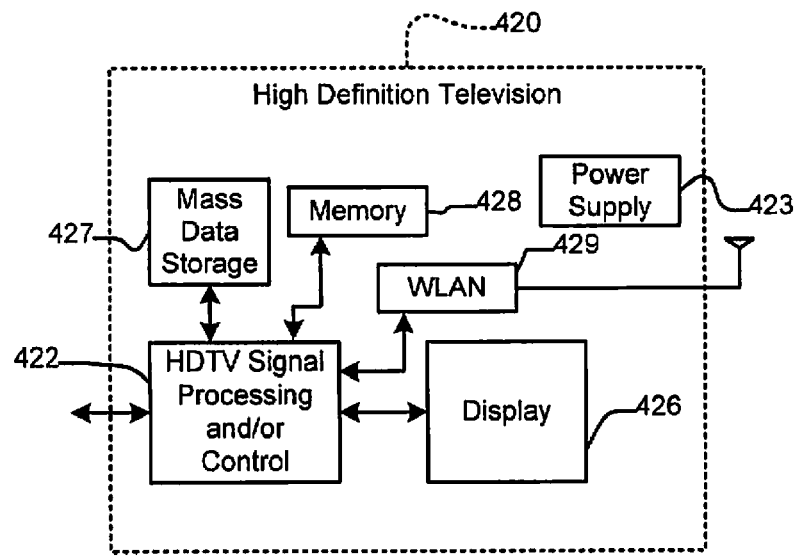
FIG. 10A is a functional block diagram of a high definition television.
Figure 10B:
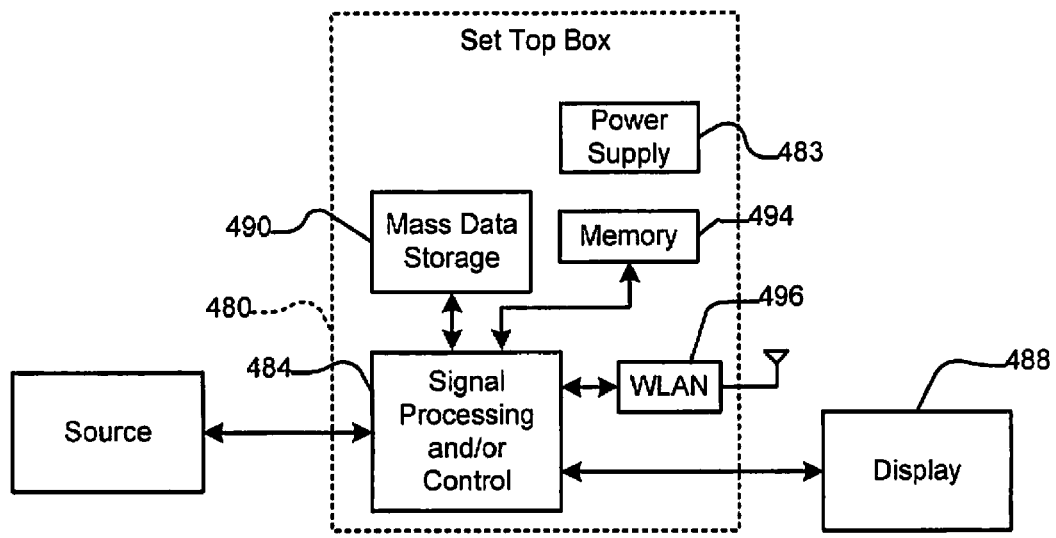
FIG. 10B is a functional block diagram of a set top box.
Figure 10C:
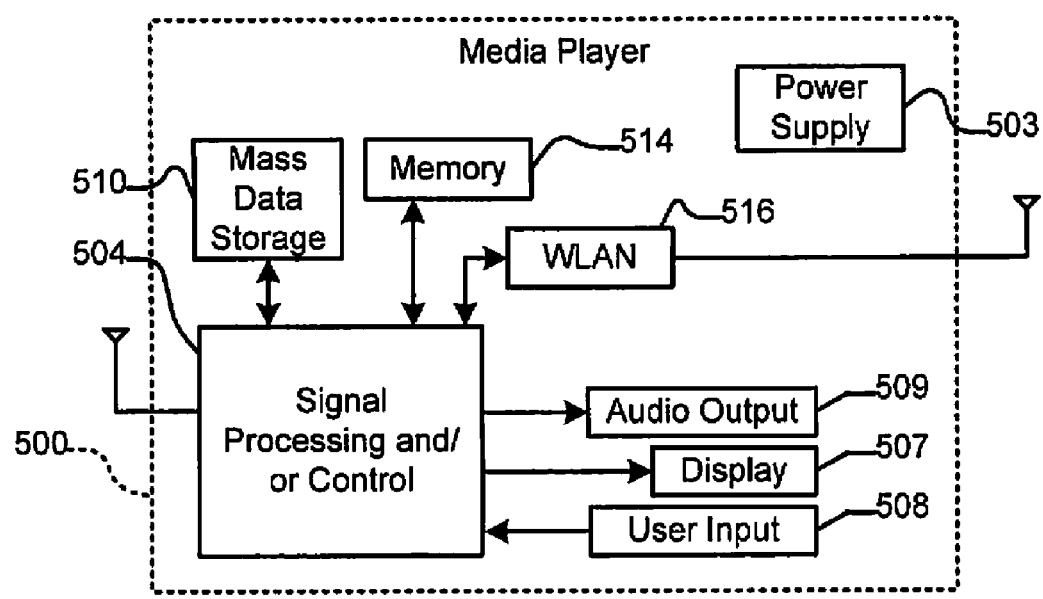
FIG. 10C is a functional block diagram of a media player.

Referring now to FIGS. 10A-10C, various exemplary implementations of the network interface are shown. Referring now to FIG. 10A, the network interface can be implemented in a high definition television (HDTV) 420. The HDTV 420 may include signal processing and/or control circuits, which are generally identified in FIG. 10A at 422, a WLAN interface, mass data storage of the HDTV 420 and/or a power supply 423. The HDTV 420 receives HDTV input signals in either a wired or wireless format and generates HDTV output signals for a display 426. In some implementations, signal processing circuit and/or control circuit 422 and/or other circuits (not shown) of the HDTV 420 may process data, perform coding and/or encryption, perform calculations, format data and/or perform any other type of HDTV processing that may be required.

The HDTV 420 may communicate with mass data storage 427 that stores data in a nonvolatile manner such as optical and/or magnetic storage devices. The HDD may be a mini HDD that includes one or more platters having a diameter that is smaller than approximately 1.8". The HDTV 420 may be connected to memory 428 such as RAM, ROM, low latency nonvolatile memory such as flash memory and/or other suitable electronic data storage. The HDTV 420 also may support connections with a WLAN via a WLAN network interface 429.

Referring now to FIG. 10B, the network interface can be implemented in a set top box 480. The set top box 480 may implement signal processing and/or control circuits, which are generally identified in FIG. 10B at 484, a WLAN interface, mass data storage of the set top box 480 and/or a power supply 483. The set top box 480 receives signals from a source such as a broadband source and outputs standard and/or high definition audio/video signals suitable for a display 488 such as a television and/or monitor and/or other video and/or audio output devices. The signal processing and/or control circuits 484 and/or other circuits (not shown) of the set top box 480 may process data, perform coding and/or encryption, perform calculations, format data and/or perform any other set top box function.

The set top box 480 may communicate with mass data storage 490 that stores data in a nonvolatile manner. The mass data storage 490 may include optical and/or magnetic storage devices for example hard disk drives HDD and/or DVDs. The HDD may be a mini HDD that includes one or more platters having a diameter that is smaller than approximately 1.8". The set top box 480 may be connected to memory 494 such as RAM, ROM, low latency nonvolatile memory such as flash memory and/or other suitable electronic data storage. The set top box 480 also may support connections with a WLAN via a WLAN network interface 496.

Referring now to FIG. 10O, the network interface can be implemented in a media player 500. The media player may include signal processing and/or control circuits, which are generally identified in FIG. 10O at 504, a WLAN interface, mass data storage of the media player 500 and/or a power supply 503. In some implementations, the media player 500 includes a display 507 and/or a user input 508 such as a keypad, touchpad and the like. In some implementations, the media player 500 may employ a graphical user interface (GUI) that typically employs menus, drop down menus, icons and/or a point-and-click interface via the display 507 and/or user input 508. The media player 500 further includes an audio output 509 such as a speaker and/or audio output jack. The signal processing and/or control circuits 504 and/or other circuits (not shown) of the media player 500 may process data, perform coding and/or encryption, perform calculations, format data and/or perform any other media player function.

The media player 500 may communicate with mass data storage 510 that stores data such as compressed audio and/or video content in a nonvolatile manner. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". The media player 500 may be connected to memory 514 such as RAM, ROM, low latency nonvolatile memory such as flash memory and/or other suitable electronic data storage. The media player 500 also may support connections with a WLAN via a WLAN network interface 516. Still other implementations in addition to those described above are contemplated.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, the specification and the following claims.

What is claimed is:

1. A physical layer device comprising:
a transceiver module configured to communicate with a medium; and
an autonegotiation module configured to
communicate with the transceiver module;
stall autonegotiation with a link partner until a selector field of the link partner is determined;
autonegotiate with the link partner over the medium using a first set of link capabilities when the selector field has a first value; and
autonegotiate with the link partner over the medium using a second set of link capabilities when the selector field has a second value,
wherein the autonegotiation module is configured to stall autonegotiation with the link partner by transmitting codewords each differing by at least one bit.

2. The physical layer device of claim 1, wherein:
the first set of link capabilities comprises at least one link capability; and
the second set of link capabilities comprises at least one link capability that is not included in the first set of link capabilities.

3. The physical layer device of claim 1, wherein the first set of link capabilities comprises 10BASE-T and 100BASE-T and the second set of link capabilities comprises 200BASE-T and 400BASE-T.

4. The physical layer device of claim 1, wherein the second set of link capabilities comprises 200BASE-T and 400BASE-T, and wherein the autonegotiation module is configured to select between 200BASE-T and 400BASE-T based on an estimated cable length between the physical layer device and the link partner.

5. The physical layer device of claim 1, further comprising a cable length estimator configured to determine a cable length between the physical layer device and the link partner based on a latency between a transmitted pulse to the link partner and a response pulse from the link partner.

6. The physical layer device of claim 5, wherein the cable length estimator is configured to determine the latency based on a time measured between transmission of the transmitted pulse and reception of the response pulse.

7. The physical layer device of claim 5, wherein the cable length estimator is configured to verify the cable length based on a plurality of latency determinations.

8. The physical layer device of claim 1, wherein the autonegotiation module is configured to stall autonegotiation with the link partner by transmitting codewords including a pause bit, and toggling the pause bit for each transmitted codeword.

9. A physical layer device comprising:
a transceiver module configured to communicate with a medium;
an autonegotiation module configured to:
communicate with the transceiver module;
stall autonegotiation with a link partner until a selector field of the link partner is detected; and
autonegotiate with the link partner using a first set of link capabilities when the selector field has a first value; and
a cable length estimator configured to determine a cable length between the physical layer device and the link partner when the selector field has a second value,
wherein the autonegotiation module is configured to autonegotiate with the link partner using a second set of link capabilities when the selector field has the second value and the cable length is greater than a corresponding one of a set of cable lengths.

10. The physical layer device of claim 9, wherein the autonegotiation module is configured to autonegotiate one of the first set of link capabilities with the link partner when the selector field has the second value and the cable length is less than each cable length in the set of cable lengths.

11. The physical layer device of claim 9, wherein:
the first set of link capabilities comprises at least one link capability; and
the second set of link capabilities comprises at least one link capability that is not included in the first set of link capabilities.

12. The physical layer device of claim 9, wherein the second set of link capabilities comprises at least one of 200BASE-T and 400BASE-T.

13. The physical layer device of claim 9, wherein the first set of link capabilities comprises 10BASE-T and 100BASE-T and the second set of link capabilities comprises 200BASE-T and 400BASE-T.

14. The physical layer device of claim 9, wherein the first set of link capabilities comprises at least one of 10BASE-T and 100BASE-T.

15. A network comprising:
the physical layer device of claim 9; and
the link partner, wherein:
the link partner comprises a link partner physical layer device; and
the physical layer device is configured to communicate with the link partner physical layer device.

16. The network of claim 15, wherein:
the physical layer device is configured to transmit a pulse to the link partner physical layer device;
the link partner physical layer device is configured to send a response pulse within a predetermined time after receiving the transmitted pulse; and
the physical layer device is configured to receive the response pulse and estimate the cable length based on a latency of the response pulse.

17. The network of claim 15, wherein the physical layer device and the link partner physical layer device are configured to exchange cable length data using burst pulses representing the cable length.

18. The physical layer device of claim 9, wherein the cable length estimator is configured to determine the cable length based on a latency between a transmitted pulse to the link partner and a received pulse from the link partner.

19. The physical layer device of claim 9, wherein the cable length estimator is configured to verify the cable length based on a plurality of latency determinations.

* * * * *